(12) United States Patent
Arold et al.

(10) Patent No.: US 6,296,564 B1
(45) Date of Patent: Oct. 2, 2001

(54) HEATER OR AIR CONDITIONER FOR VEHICLES

(75) Inventors: Klaus Arold, Sindelfingen; Stefan Giez, Grafenau, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/639,774

(22) Filed: Aug. 16, 2000

(30) Foreign Application Priority Data

Aug. 18, 1999 (DE) ............................................. 199 39 212

(51) Int. Cl.[7] .......................................................... B60H 3/00
(52) U.S. Cl. .................................................................. 454/156
(58) Field of Search .................................... 454/121, 156, 454/160, 161

(56) References Cited

FOREIGN PATENT DOCUMENTS 41 19 474 C2    12/1995  (DE) .

*Primary Examiner*—Harold Joyce
(74) *Attorney, Agent, or Firm*—Crowell & Moring, LLP

(57) ABSTRACT

A heating or air-conditioning system for a vehicle has a cold-air duct and a warm-air duct which open out into an air-mixing chamber. One control member is assigned to each of the cold-air duct and the warm-air duct for setting the amount of cold or warm air which flows into the air-mixing chamber. The control member for the amount of warm air is designed as a shutter which includes a plurality of closure lamellae which are arranged next to one another, which overlap one another in the closed position, and which can be pivoted by a common actuating drive. To achieve a less progressive, substantially linear control curve of the shutter in the lower pivoting range, the shutter is designed in such a way that the individual closure lamellae, when they pivot out of their closed positions, open up unevenly sized opening cross sections for the warm air to pass through.

10 Claims, 2 Drawing Sheets

HEATER OR AIR CONDITIONER FOR VEHICLES

BACKGROUND AND SUMMARY OF THE INVENTION

The present invention relates to an improved heating or air-conditioning system for vehicles which has a cold-air duct and a warm-air duct which open out into an air-mixing chamber. A first control member, assigned to the cold-air duct, sets the amount of cold air which flows into the air-mixing chamber, and a second control member, assigned to the warm-air duct, sets the amount of warm air which flows into the chamber. The second control member is designed as a shutter having a plurality of pivotable closure lamellae which are arranged next to one another, overlap one another in the closed position, and can be pivoted by a common actuating drive.

In a known air-conditioning system of this type (DE 41 19 474 C2), both the cold-air control member and the warm-air control member are designed as shutters. In each case, two-winged closure lamellae can pivot about one centrally arranged pivot axis. To close off and to partially or completely open up the associated duct cross section, the closure lamellae are simultaneously pivoted through the same pivot angle.

Such shutters may be used in air-controlled air-conditioning systems, in which the desired compartment temperature in the passenger cell is set exclusively by mixing suitable amounts of warm air and cold air at the heat exchanger which is constantly heated by the cooling water of the internal-combustion engine. When the shutters are used in such air-conditioning systems, it has been found that, in the lower control range of the air temperature, the control curve is excessively progressive, i.e. the amount of warm air which flows into the air-mixing chamber is too high in the range of small opening angles of the closure lamellae.

One object of the present invention is to achieve a more linear control curve of the mixed-air temperature or of the amount of warm air flowing into the air-mixing chamber in a heating or air-conditioning system of the type described above. It is also an object of the invention to achieve this more linear control with the actuating travel of the common actuating drive for the closure lamellae by suitably designing the shutter for the warm-air duct.

According to the invention, the object is achieved by having the individual closure lamellae, when they are pivoted out of their closed positions, open up unevenly sized opening cross sections for the warm air to pass through. The sum of the unevenly sized opening cross section is such that a predetermined amount of warm air is fed to the air-mixing chamber as a function of the actuating travel of the actuating drive.

The heating or air-conditioning system according to the invention has the advantage that a linear or any other desired control curve can be achieved for the mixed-air temperature by suitably influencing the pivoting travel of the closure lamellae. In this way, it is possible to accurately adapt the control curve, particularly in the lower temperature range. Moreover, by differently setting the opening cross sections which are opened up by the individual closure lamellae, the flow of air into the air-mixing chamber is also optimized, so that the mixing of cold air and warm air is improved.

Advantageous embodiments of the heating or air-conditioning system according to the invention, with expedient refinements and configurations of the invention, are further reflected in the claims.

According to one advantageous embodiment of the invention, the closure lamellae are coupled to the actuating drive in such a manner that, for the same actuating travel, they rotate through different pivoting angles. In this case, the closure lamellae are preferably coupled to the pivoting drive in such a way that, with increasing distance of the closure lamellae from the cold-air duct opening in the airmixing chamber, the pivoting angle of the lamellae decreases for the same actuating travel of the actuating drive. The closure lamellae may be of one-winged or two-winged design, with the pivot axes being arranged at the edge or in the center of the lamellae.

In an alternative embodiment of the invention, the closure lamellae are coupled to the actuating drive in such a manner that they are pivoted successively. In this case, the pivoting operation of a following closure lamellae commences after the end of the pivoting operation of the preceding closure lamellae.

According to one preferred embodiment of the invention, the closure lamellae are pivotable about a centrally arranged pivot axis, and a curved blocking surface is fixed to the duct wall, concentrically with respect to the pivot axis of at least one outer closure lamellae which is next to the duct wall. The edge of that wing of the outer closure lamellae which faces towards the duct wall is sealed against this blocking surface. In this case, the blocking surface extends, starting from the closed position of the outer closure lamellae, over a predetermined partial pivoting travel of this lamellae. By providing a design of this type, it is possible to influence the control curve of the shutter using little manufacturing outlay. Compared to conventional shutters, it is only necessary to alter the housing moulds and, if the blocking surface is formed on a frame which holds the closure lamellae and is fitted into the duct, the frame moulds. There is no additional outlay on parts.

According to one advantageous embodiment of the invention, the shutter has at least three closure lamellae and each wing of the two outer closure lamellae which faces towards the duct wall is assigned a blocking surface. In this way, the opening cross section of the shutter in the lower control range can be set even more finely.

The invention is described in more detail below with reference to exemplary embodiments illustrated in the drawings.

DESCRIPTION OF THE PREFERRED EMBODIMENTS

Figure 1:
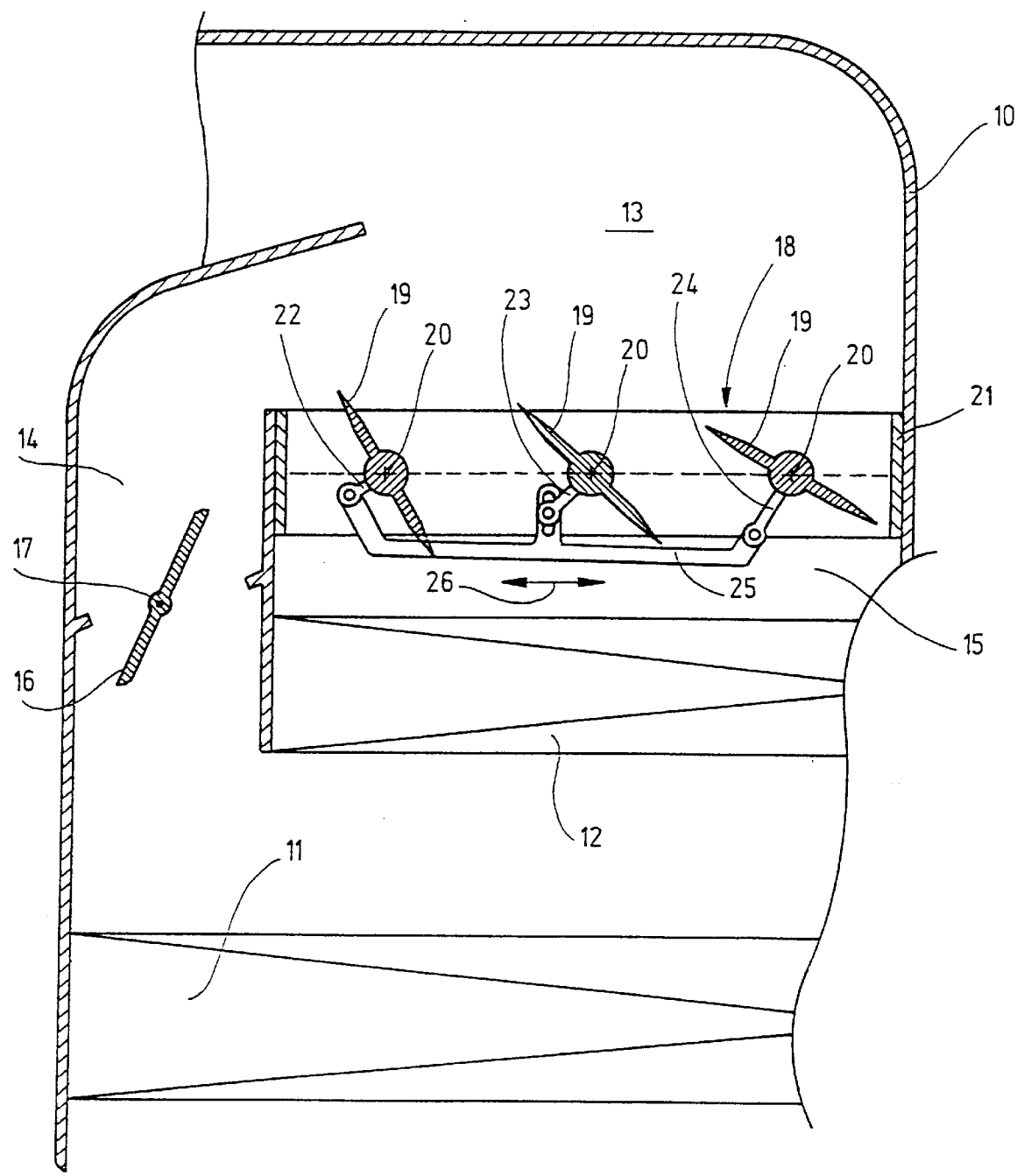
FIGS. 1 and 2 show portions of a longitudinal section through a so-called air-conditioning cabinet of an air-conditioning system for a vehicle in accordance with first and second embodiments.

The air-conditioning cabinet of an air-conditioning system for vehicles which is illustrated diagrammatically, in part, in longitudinal section in FIG. 1 has a housing 10 in which an evaporator 11 and a heat exchanger 12 are fitted. The housing 10 encloses an air-mixing chamber 13. From the evaporator 11, a cold-air duct 14 leads to the air-mixing chamber 13, and from the heat exchanger 12, a warm-air duct 15 leads to the air-mixing chamber 13. Various ducts (not shown here) lead from the air-mixing chamber 13 to the passenger compartment of the vehicle. The openings of the cold-air duct 14 and the warm-air duct 15 in the air-mixing chamber 13 are arranged next to one another. Cold-air duct 14 and warm-air duct 15 may each optionally be closed, or partially or fully opened, by a control member so that the amounts of cold and warm air flowing into the air-mixing chamber 13 can be metered. The control member assigned to the cold-air duct 14 is designed as a two-winged pivoting flap 16 which can pivot about a centrally arranged pivot axis 17. The control member assigned to the warm-air duct 15 is designed as a shutter 18 comprising three two-winged closure lamellae 19. Each of these lamellae is pivotable about ore centrally arranged pivot axis 20. The pivot axes 20 are arranged in a frame 21 at equal distances from one another, the arrangement being such that the closure lamellae 19 overlap one another in their closed positions, in which they completely cover the warm-air duct 15.

The three closure lamellae 19 are pivoted jointly by an actuating drive (not shown here). The individual closure lamellae 19 are coupled to a pivoting drive in such a manner that, when they pivot out of the closed position, they open up unevenly sized opening cross sections for the warm air to pass through. The sum of the opening cross sections is such that a predetermined amount of warm air is fed to the mixed-air chamber 14 as a function of the actuating travel of the actuating drive.

For this purpose, in the exemplary embodiment shown in FIG. 1, for one actuating travel covered by the actuating drive, the three closure lamellae 19 turn through different rotation or pivoting angles. The closure lamellae 19 which is closest to the opening of the cold-air duct 14 experiences the greatest amount of pivoting, while the pivoting angle of the other closure lamellae 19 decreases with increasing distance from the cold-air duct opening. To achieve this, the closure lamellae 19 are linked to a driver rod 25 via, in each case, one actuating arm 22 or 23 or 24, which is connected in a rotationally fixed manner to the closure lamellae 19. This driver rod can be displaced longitudinally in the direction indicated by the double arrow 26 by the actuating drive. The lengths of the actuating arms 22–24 are selected differently according to the desired pivoting angle of the closure lamellae 19, with the actuating arm 22 of the closure lamellae 19 which is closest to the cold-air duct opening being the shortest and the actuating arm 24 of the closure lamellae 19 which is furthest away from the cold-air duct opening being the longest. This kinematic arrangement ensures that, for the same sliding travel of the driver rod 25, as mentioned above, the left-hand closure lamellae 19 (as seen in FIG. 1) undergoes the greatest pivoting and the right-hand closure lamellae 19 (as seen in FIG. 1) undergoes the smallest amount of pivoting. The pivoting angle of the middle closure lamellae 19 is between these two pivoting angles of the outer closure lamellae 19.

In an alternative embodiment, to achieve the same effect, namely that of making the control curve linear by unequal opening of the closure lamellae 19, the closure lamellae 19 are coupled to the actuating drive in such a manner that they are pivoted successively. The pivoting operation of the following closure lamellae commences in each case after the end of the pivoting operation of the preceding closure lamellae 19.

Figure 2:
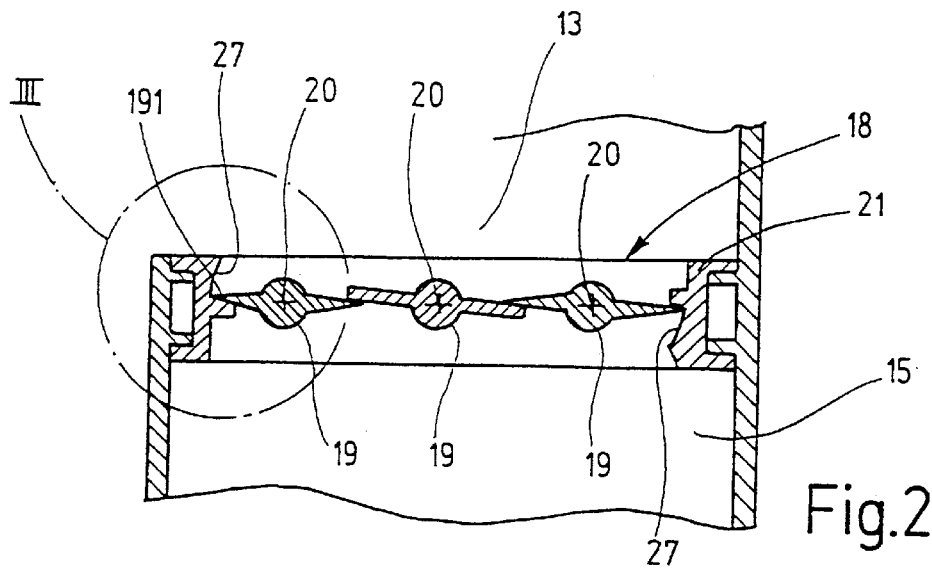

In the air-conditioning system which is illustrated in part in FIG. 2, the opening of the closure lamellae 19 with an unevenly sized opening cross section is achieved by assigning one curved blocking surface 27, which extends concentrically with respect to the pivot axis 20 of the respective outer closure lamellae 19 over a predetermined partial pivoting range of the closure lamellae 19, to each of the two outer closure lamellae 19. of a total of three two-winged closure lamellae 19, the two outer closure lamellae are closest to the duct wall of the warm-air duct 15. As in the embodiment shown in FIG. 1, the pivot axes 20 of the three closure lamellae 19 are accommodated in the frame 21, which for its part is fitted in the warm-air duct 15 and is attached to the duct walls. The two blocking surfaces 27 are formed concentrically with respect to the pivot axes 20 of the two outer closure lamellae 19, on the inner wall of the frame 21 which faces towards the closure lamellae 19.

Figure 3:
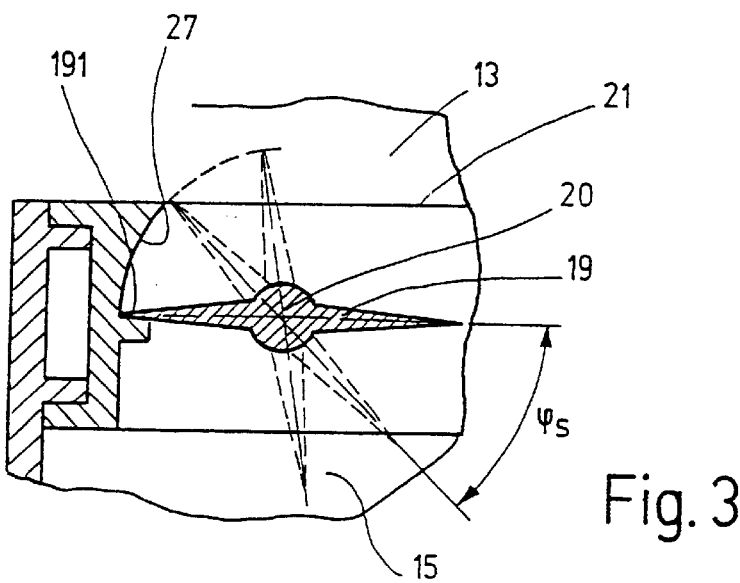
FIG. 3 shows an enlarged view of the portion III of FIG. 2.

FIG. 3 shows an enlarged view of the way in which the left-hand outer closure lamellae 19 interacts with the blocking surface 27 on the frame 21. It can be seen clearly that the wing edge 191 of the closure lamellae 19, in the pivoting range of the angle $\phi_s$, is sealed against the blocking surface 27, so that in the pivoting range of the two outer closure lamellae 19 which is fixed by the angle $\phi_s$ warm air can only pass through in the areas between the three closure lamellae 19, but not between the two outer closure lamellae 19 and the duct wall.

Figure 4:
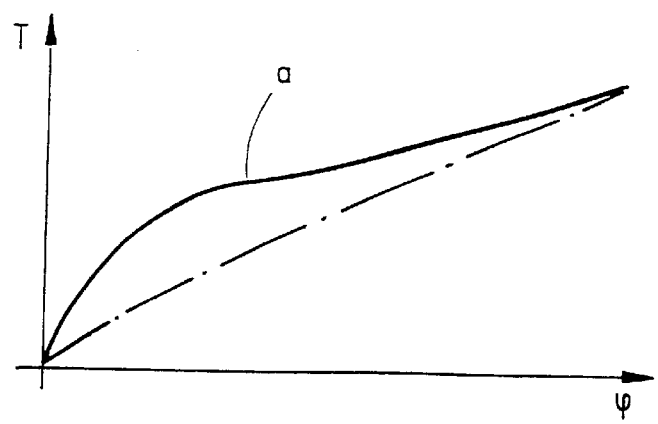
FIG. 4 is a graph illustrating a control curve of a conventional air-conditioning system and the control curve of the air-conditioning system shown in FIG. 2.

In this way, in the range of small opening angles ($<\phi_s$) of the closure lamellae 19, the total opening cross section for the passage of warm air which is opened up through the three closure lamellae 19 is reduced compared to the design of the shutter 18 without the two blocking surfaces 27. By providing suitable adaptation, it is in this way possible to influence the control curve of the shutter 18 as illustrated in FIG. 4. In FIG. 4, "a" shows the control curve of the shutter 18 without the presence of the blocking surfaces 27, and "b" shows the control curve of the shutter 18 in accordance with the embodiment shown in FIGS. 2 and 3. It can be seen clearly that, as a result of the opening cross section being reduced in the pivoting-angle range $\phi_s$, the control curve is less progressive and is virtually linear.

To enable the control curve shown in FIG. 4 to be adapted with even greater accuracy to the desired linearity, it is possible for the two blocking surfaces 27 (not illustrated further in FIGS. 2 and 3) to be designed in such a way that, with an increasing pivoting angle of the two outer closure lamellae 19, an opening cross section between the wing edge 191 and the blocking surface 27 increases in size in steps or continuously.

Naturally, it is possible, with the shutter 18 shown in FIGS. 2 and 3, to assign a blocking surface 27 to only a single outer closure lamellae 19. It is also possible for the number of closure lamellae 19 which are present to be increased to more than three.

The closure lamellae 19 of the shutter 18 may also be of one-winged design, in which case the pivot axis extends along an edge of the lamellae.

In the event the evaporator 11 breaks down, the system operates as a pure heating system, with the cold-air duct 14 carrying fresh air which has been sucked in from the environment surrounding the vehicle.

The foregoing disclosure has been set forth merely to illustrate the invention and is not intended to be limiting. Since modifications of the disclosed embodiments incorporating the spirit and substance or the invention may occur to persons skilled in the art, the invention should be construed to include everything within the scope of the appended claims and equivalents thereof.

We claim:

1. Heating or air-conditioning system for vehicles comprising:

a cold-air duct and a warm-air duct which open out into an air-mixing chamber, a first control member, assigned to the cold-air duct, which sets the amount of cold air which flows into the air-mixing chamber, and a second control member, assigned to the warm-air duct, which sets the amount of warm air which flows into the air-mixing chamber, the second control member being designed as a shutter having a plurality of pivotable closure lamellae which are arranged next to one another, overlap one another in the closed position, and can be pivoted by a common actuating drive, wherein the individual closure lamellae, when pivoted out of the closed position, open up unevenly sized opening cross sections for the warm air to pass through, the sum of the unevenly sized opening cross sections being such that a predetermined amount of warm air is fed to the air-mixing chamber as a function of the actuating travel of the actuating drive.

2. System according to claim 1, wherein the closure lamellae are coupled to the actuating drive in such a manner that, for a given actuating travel, they rotate through different pivoting angles.

3. System according to claim 2, wherein the openings of the cold-air and warm-air ducts in the air-mixing chamber lie next to one another, and wherein the closure lamellae are coupled to the pivoting drive in such a way that the pivoting angles of the closure lamellae, for the same actuating travel of the actuating drive, decrease with increasing distance of the individual closure lamellae from the cold-air duct opening.

4. System according to claim 2, wherein each closure lamellae is coupled to a driver rod, which can be displaced in the longitudinal direction by the actuating drive, via an actuating arm which is connected to said lamellae in a rotationally fixed manner, and wherein the actuating arms are of different lengths.

5. System according to claim 4, wherein the lengths of the actuating arms associated with the individual closure lamellae increase with increasing distance of the closure lamellae from the cold-air duct opening.

6. System according to claim 1, wherein the closure lamellae are coupled to the actuating drive in such a manner that they are pivoted successively, the pivoting operation of a following closure lamellae commencing after the end of the pivoting operation of a preceding closure lamellae.

7. System according to claim 1, wherein the closure lamellae are two-winged and can pivot about a centrally arranged pivot axis, and wherein an edge of that wing of the outer closure lamellae which faces towards the duct wall is sealed against a curved blocking surface which is fixed to the duct wall, is concentric with respect to the pivot axis of the outer closure lamellae and, starting from the closed position of the outer closure lamellae, extends over a predetermined partial pivoting travel of the outer closure lamellae.

8. System according to claim 7, wherein the blocking surface is designed in such a way that with an increasing pivoting travel of the outer closure lamellae, an opening cross section between the wing edge of this outer closure lamellae and the blocking surface increases in steps or continuously.

9. System according to claim 7, wherein the shutter has at least three closure lamellae and each wing of the two outer closure lamellae which faces towards the duct wall is assigned a blocking surface.

10. System according to claim 7, wherein the closure lamellae are accommodated in a frame which is fitted into the warm-air duct, and wherein the blocking surfaces are formed on the frame.

\* \* \* \* \*